United States Patent
Russell et al.

[11] Patent Number: 6,159,380
[45] Date of Patent: Dec. 12, 2000

[54] WATER TREATMENT PROCESS

[75] Inventors: Larry L. Russell, Tiburon; Louis Mohar, Castro Valley, both of Calif.

[73] Assignee: Container-Care International, Inc., Galena Park, Tex.

[21] Appl. No.: 08/420,852

[22] Filed: Apr. 12, 1995

Related U.S. Application Data

[62] Division of application No. 08/280,359, Jul. 26, 1994, Pat. No. 5,520,803.

[51] Int. Cl.⁷ .................................................. C02F 1/52
[52] U.S. Cl. .......................... 210/709; 210/710; 210/714; 210/721; 210/724; 210/737; 210/770; 210/912
[58] Field of Search ..................... 210/702, 709, 210/710, 721, 724, 725, 742, 96.1, 143, 182, 184, 195.1, 202, 205, 241, 257.1, 262, 206, 208, 737, 708, 714, 912, 770

[56] References Cited

U.S. PATENT DOCUMENTS

| | | | |
|---|---|---|---|
| 1,364,387 | 1/1921 | Landreth | 210/721 |
| 3,835,045 | 9/1974 | Hussissian | 210/709 |
| 4,332,693 | 6/1982 | Piepho | 252/181 |
| 4,415,467 | 11/1983 | Piepho | 252/181 |
| 4,536,286 | 8/1985 | Nugent | 210/202 |
| 4,655,916 | 4/1987 | Schlesiger | 210/173 |
| 4,668,388 | 5/1987 | Dibble et al. | 210/170 |
| 4,724,084 | 2/1988 | Pahmeier et al. | 210/721 |
| 4,765,908 | 8/1988 | Monick et al. | 210/666 |
| 4,775,468 | 10/1988 | Peterson | 210/205 |
| 4,834,840 | 5/1989 | Capella | 202/172 |
| 4,923,629 | 5/1990 | Hawegawa et al. | 252/181 |
| 4,925,571 | 5/1990 | Jacob et al. | 210/742 |
| 5,071,587 | 12/1991 | Perman | 252/181 |
| 5,106,508 | 4/1992 | Schwitzgebel | 210/721 |
| 5,156,749 | 10/1992 | Williams | 210/770 |
| 5,336,398 | 8/1994 | Russell et al. | 210/143 |

FOREIGN PATENT DOCUMENTS

| | | | |
|---|---|---|---|
| 3926269 | 2/1991 | Germany | 210/609 |
| 2004859 | 4/1979 | United Kingdom | 210/241 |

*Primary Examiner*—Peter A. Hruskoci
*Attorney, Agent, or Firm*—Limbach & Limbach LLP

[57] ABSTRACT

A simple, rapid, efficient and inexpensive process for on-site recycling of wastewater with minimal odor wherein the solid wastes generated by the water treatment process are dewatering on-site by solar energy to water content levels below those required for disposal. All operations, including solar dewatering, are accomplished in a compact unit which may be mobile. The solar dewatering unit includes a drying pan over which a solar collector window arrangement is disposed. In the process, wastewater, a water purifying composition and an oxidizing agent are additively mixed together in a first reactor settling tank and the resulting composition is neutralized to a pH of between 7.5–9.4. The added water purifying composition is then allowed to precipitate wherein it binds to and precipitates heavy metals as well as other impurities. The precipitated purifying composition forms a non-hazardous sludge at the bottom of the tank. The resulting supernatant is pumped through a filter to yield recycled wastewater suitable for disposal or reuse. The remaining sludge is pumped to a third tank where it is accumulated and thickened. Once a sufficient amount of sludge is accumulated, the sludge is pumped to a solar dewatering unit where the sludge is dried to a water content level below 50% water which is suitable for landfill disposal.

10 Claims, 3 Drawing Sheets

WATER TREATMENT PROCESS

This is a divisional of application Ser. No. 08/280,359, filed Jul. 26, 1994, now Pat. No. 5,520,803.

FIELD OF THE INVENTION

The present invention relates to a wastewater treatment process. More specifically, the present invention relates to a recycling wastewater treatment process useful for on-site removal of heavy metals, fats, oils, grease and paint residues from wastewater and the subsequent on-site treatment of the solid waste generated from the wastewater treatment process.

BACKGROUND OF THE INVENTION

Most industries are presently faced with significant waste disposal problems. As the world becomes more ecologically aware and as governments enact stricter environmental laws, the need for simple, efficient and effective methods for treating waste will increase.

Of particular concern in the area of industrial waste management is the treatment of wastewater. An additional, related concern to the treatment of wastewater is the subsequent treatment and disposal of the solid wastes generated from wastewater treatment processes.

I. WASTEWATER TREATMENT

On-site wastewater treatment processes are especially needed in light of the volume and mobility of this form of waste as well as the enactment of stricter regulatory laws. For example, Congress recently enacted the Clean Water Act (CWA-PL92–500), which established a framework for the discharge of treated wastewater to the waters of the United States. One of the provisions of this law levies a $25,000 per day per waste constituent fine against violators. Provisions of the Clean Water Act have also recently been expanded to cover both point and non-point discharges to the waters of the United States.

The provisions of the non-point regulations address the concerns of mixing industrial wastewater with storm water runoff. Two industries particularly impacted by these recent enactments to the Clean Water Act are the transportation and construction industries. Transportation industries must now control incidental losses of oil and grease from vehicle operation. Construction industries must now control the content and turbidity of their storm water runoff.

The marine cargo container maintenance industry has been significantly impacted by these changes to the Clean Water Act. The fact is that most companies in this industry currently violate the Clean Water Act by their uncontrolled discharge of untreated water. Under current industry practice, the untreated water generated from cleaning marine containers is presently allowed to drain to the ground after washing. This wastewater eventually mingles with storm water when rain occurs. This results in a violation of the Clean Water Act whenever there is rainwater runoff.

In order to enable better on-site wastewater management and to assist companies in complying with the Clean Water Act, a simple, efficient, and economical on-site device and process for treating and recycling wastewater is needed.

Wastewater is heavy and therefore costly to transport to off-site water treatment facilities. Further, given storage constraints, wastewater treatment will generally be required frequently. Therefore, it is important that wastewater treatment systems be simple to operate so as to enable those relatively unskilled in the art of wastewater treatment to practice the wastewater treatment process on-site. Simplicity of operation is also an important factor for keeping the cost of water treatment to a minimum.

Water recycling systems also require that there be interim wastewater storage. In order to minimize the capital costs associated with the interim storage facility, the water purification system must be capable of processing large amounts of water rapidly.

Another area of concern regarding wastewater treatment is the minimization of the total volume of wastewater generated. In some areas, water is scarce and/or expensive. In such areas, it is particularly desireable to minimize the volume of water employed.

In addition, the cost of wastewater disposal is increasing rapidly everywhere. A purification system that recycles wastewater has the further advantage of minimizing the total volume of wastewater that is ultimately generated. Volume minimization also serves to facilitate the containment and isolation of the waste contaminants. Thus, a closed loop process capable of recycling one batch of wastewater over and over again is particularly desirable.

Numerous methods have been developed for the removal of wastes from wastewater. For example, agents have been added to wastewater that chemically react with the contaminants. Chemical processes often have the disadvantages of being time consuming and requiring complex reaction installations resulting in considerable capital costs. In addition, chemical methods commonly cause the formation of gaseous wastes that also require proper disposal.

One area of particular concern regarding wastewater treatment is the removal of heavy metals from wastewater. Heavy metals, such as copper, iron, silver, zinc, nickel, lead, cadmium and chromium pose severe health and environmental dangers due to the high toxicity of these metals. Zeolites (Perman, U.S. Pat. No. 5,071,587) and anionic polyelectrolytes (Monick, et al., U.S. Pat. No. 4,765,908) have been used to remove heavy metals from wastewater solutions.

Water evaporation processes that yield a concentrated composition of waste contaminants have also been employed as a purification method. Water evaporation has the disadvantage that it is energy intensive thus rendering this method of purification economically impractical. In addition, evaporation methodologies are not resource efficient where water is expensive and/or in short supply.

Fine suspended waste particles are commonly removed by chemical flocculating agents capable of binding to these waste particles. Iron-II salts, aluminum sulfate, calcium hydrate compositions and lime or sodium aluminate with activated silicic acid compositions are commonly employed as chemical flocculation agents. Chemical flocculating agents can be deficient in the sense that they do not effectively remove solubilized waste components.

Additional water purification methods include those methods that cause thermal, electrical and mechanical decomposition of the waste contaminants.

II. TREATMENT AND DISPOSAL OF WASTES GENERATED PROM WATER TREATMENT PROCESSES

A further concern regarding the treatment of wastewater is the subsequent treatment and disposal of the solid wastes generated by water treatment processes.

Currently, companies engaging in on-site wastewater treatment are forced to transport the waste generated off-site for further dewatering in order to comply with state standards. For example, in California, the Water Resources Control Board requires sludge to be dried to below a 50 percent water content before it can be disposed of in a landfill. On-site mechanical dewatering, generally, cannot achieve this level of drying.

On-site mechanical dewatering is currently done by mechanically pressing or squeezing the water out of the sludge. Presently, this mechanical process can only lower the water content to 60–70%. In addition, once dried, the sludge must be stored in a dry environment in order to prevent the re-absorption of water until it can be transported for further processing. In light of the current need to ship partially dried solids off-site for further dewatering, existing "on-site" wastewater treatment facilities cannot be said to be completely "on-site."

In addition to being unable to yield a final disposable solid waste, current dewatering methods are labor intensive, cost inefficient and environmentally insensitive. In addition, substantial capital costs are required for both dewatering and storage.

The present need to transport wastes off-site for additional dewatering further increases already significant water treatment costs. The water content of the sludge needlessly escalates already high transportation costs. Thus, an on-site means for achieving drier sludge, even if that drier sludge required further processing, would reduce the costs of solid waste disposal. Furthermore, it is environmentally wasteful to transport overly wet sludge. As energy costs increase, current methods of solid waste disposal become increasingly impractical. Thus, a significant need exists for an improved method for on-site dewatering of solid wastes.

SUMMARY OF THE INVENTION

In order to address these problems, the invention relates to an integrated, mobile wastewater treatment device for the treatment of heavy metals, paint residues, fats, oils and grease comprising a reactor/settling tank in which wastewater is treated to yield a supernatant and a sludge, a filter through which the supernatant is pumped, a holding tank to which filtered supernatant is pumped, a second holding to which sludge from the reactor/settling tank is pumped, and a solar dewatering unit for accumulating and thickening the sludge, wherein each of the tanks, filter and dewatering unit are configured so that the entire system can be mounted on a chassis.

In a preferred embodiment, the wastewater treatment device further comprises a wash rack useful for collecting wastewater wherein the collected wastewater is pumped to the reactor/settling tank for treatment. The device is capable of automated operation.

In the most preferred embodiment, the tanks and filter are arranged within a standard marine cargo container and the dewatering device is positioned on the top of the container. The dewatering unit comprises a drying pan and a solar collector, such as a glass or plastic window, positioned over said pan.

The e process of the instant invention comprises a first step wherein wastewater, a water purifying composition and an oxidizing agent are additively mixed together in a first reactor/settling tank. During the additive mixing, the pH of the resulting composition is neutralized to a pH of between 7.5–9.4. In the second step of the process, the water purifying composition on is allowed to precipitate wherein it binds to and precipitates heavy metals as well as other impurities. The precipitated purifying composition forms a sludge at the bottom of the tank. In the third step of the process, the resulting supernatant is pumped through a filter to yield recycled wastewater suitable for disposal or reuse. The remaining sludge is pumped to a third tank where it is accumulated and thickened. Once a sufficient amount of sludge is accumulated, the sludge is pumped to a solar dewatering unit where the sludge is dried to a water content level below 50% water which is suitable for landfill disposal.

BRIEF DESCRIPTION OF THE FIGURES

The invention will be better understood by reference to the appended Figures, of which.

DETAILED DESCRIPTION OF THE INVENTION

Figure 1:
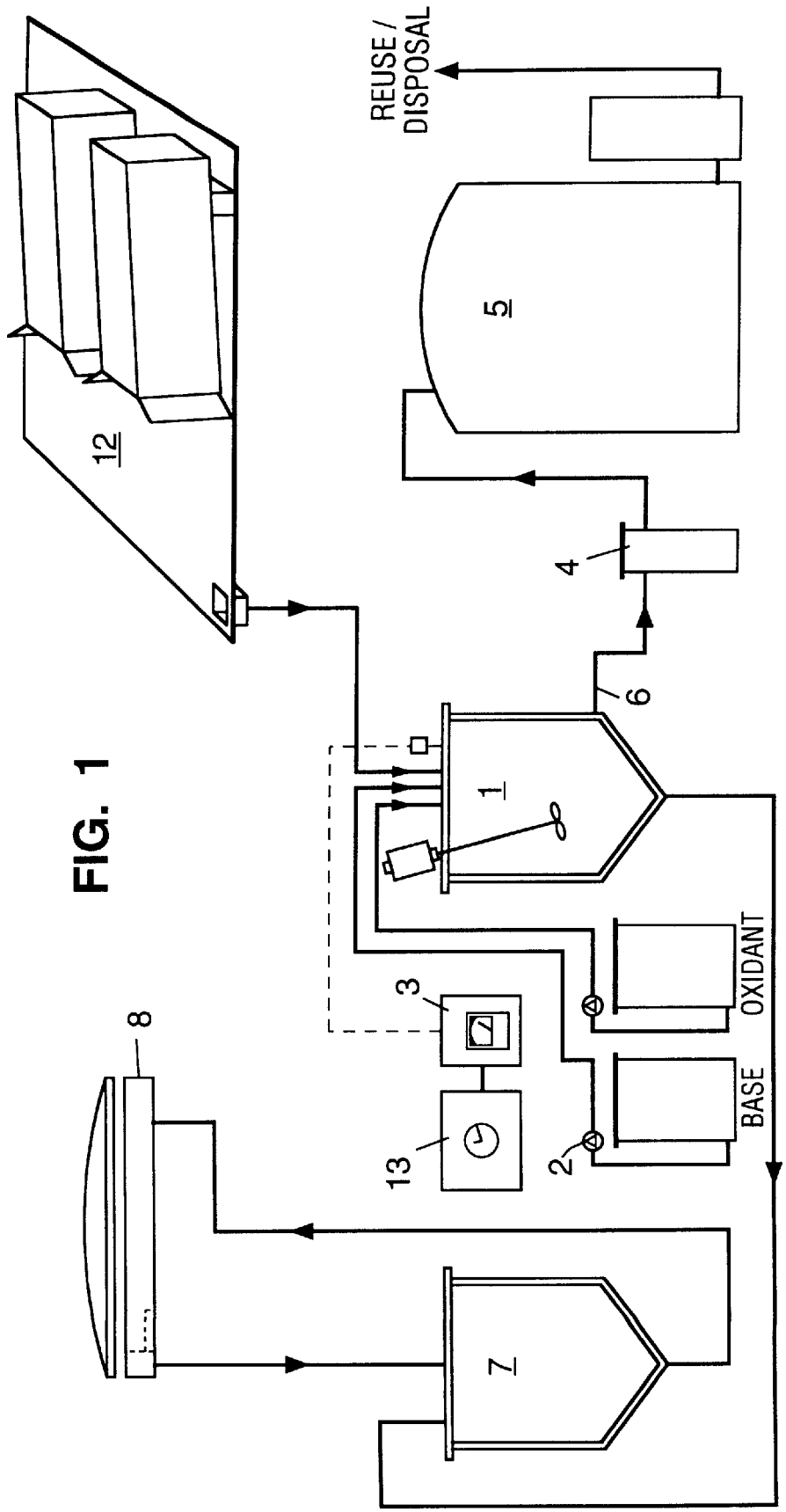
FIG. 1 provides a schematic of an automated recycling water process according to the invention.
Figure 2:
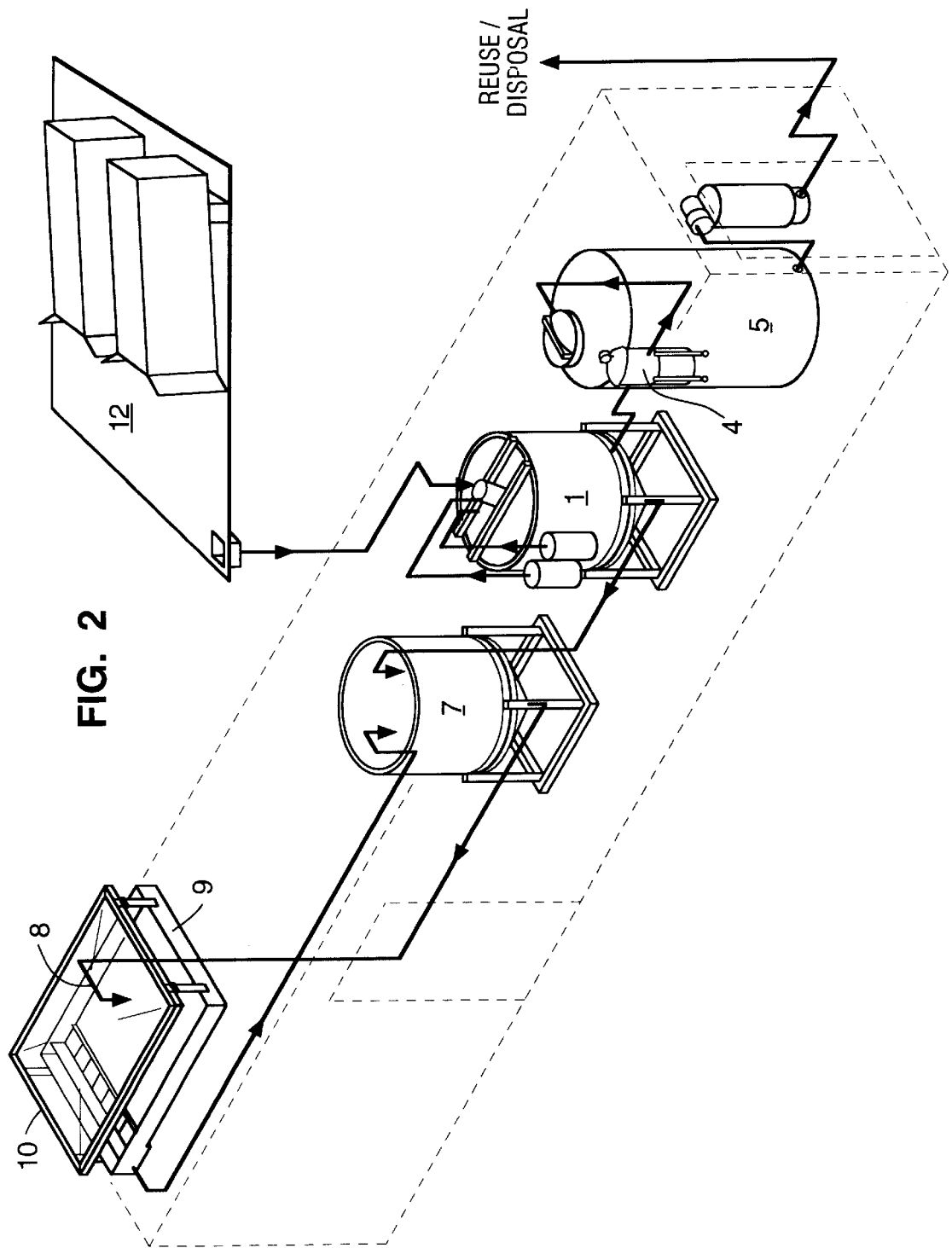
FIG. 2 provides a three-dimensional depiction of the automated recycling water process.
Figure 3:
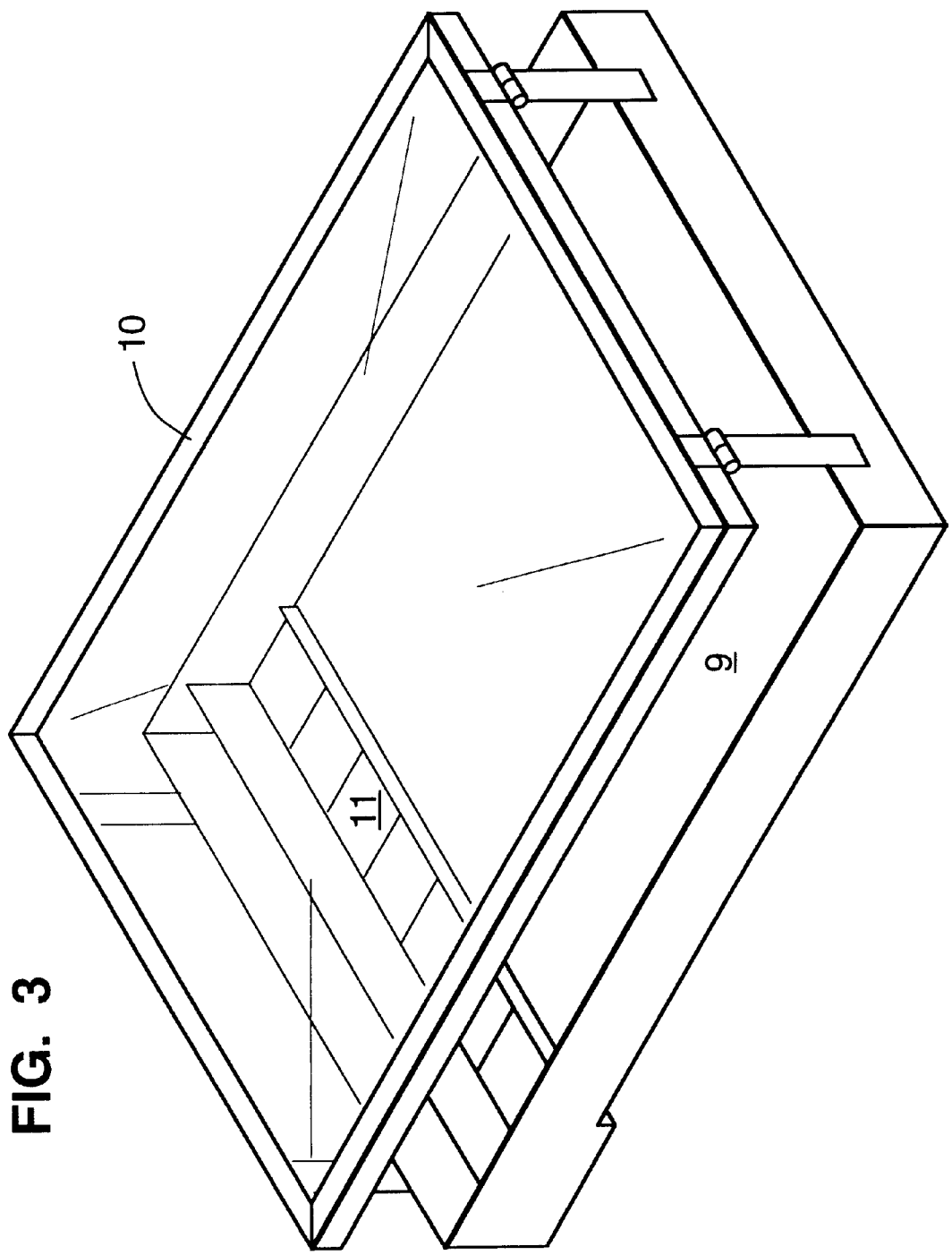
FIG. 3 provides a detailed depiction of the solar dewatering unit of the instant invention.

The present invention is a simple, rapid, efficient and inexpensive process enabling the on-site continuous recycling of wastewater on a large scale as well as the on-site treatment of the solid wastes generated by the water treatment process. The most preferred embodiment of the instant invention is shown in FIGS. 1–3 in which like numbers are used to designate the same elements in each figure. Thus, in this embodiment, wastewater is accumulated in a several hundred gallon reactor/settling tank 1. The reactor/settling tank preferably possesses a cone shaped bottom which facilitates mixing and the subsequent formation and separation of the precipitated purifying composition at the bottom of the tank. This tank design also enables enhanced supernatant separation over other tank designs.

Once the wastewater to be treated has been placed in the reactor/settling tank, a water purifying composition and an oxidizing agent are additively mixed into the wastewater. The addition of the water purifying composition and the oxidizing agent to the wastewater is preferably done over a three minute period.

A wide variety of suitable purifying compositions are known in the art including those taught by Monick, et al. (U.S. Pat. No. 4,765,908), Piepho (U.S. Pat. No. 4,415,467), Piepho (U.S. Pat. No. 4,332,693) and Hasegawa, et al. (U.S. Pat. No. 4,923,629).

The preferred purifying composition of the instant invention is American Colloid Company product number RM1080N4 (hereinafter "IRM1080N4") (American Colloid Company 150 West Shure Drive, Arlington Heights, Ill.). RM-1080N4 is a bentonite clay composition that acts as a chemical binding agent. RM1080N4 acts by binding to the heavy metals, oils and grease in the wastewater. Shortly after introducing RM1080N4 to the wastewater, RM1080N4 forms a sweep floc causing the heavy metal, oil and grease impurities to settle at the bottom of the cone shaped reactor/settling tank. As a bentonite clay agent, RM1080N4 has the advantage that it does not change the pH of the wastewater solution. Other water purification reactants commonly contain aluminum sulfate or lime which alter the pH of the wastewater. It is preferred that 5.1 pounds of RM1080N4 per 100 gallons of wastewater is used.

An oxidizing agent is used to oxidize solids and inhibit the formation of foul smelling odors. Sodium hypochlorite is the preferred oxidant. Preferably, 1 pound of neat sodium hypochlorite is used per 1000 gallons of wastewater. During the addition of the purifying composition and the oxidant, the resulting solution is preferably mixed at G ≧100/second to ensure adequate dispersion of purifying composition throughout the wastewater.

The pH of the treatment mixture is neutralized to pH 7.5–9.4 using a strong base. Soda ash is the preferred base. A pump 2 delivering the base to the reactor/settling tank is automatically electronically coordinated with a pH meter and a neutralization controller 3 to regulate the pH of the treatment composition.

once the purifying composition and oxidizing agent are introduced, the resulting mixture is allowed to stand until the purifying composition forms a floc that settles to the bottom of the tank in the form of a sludge. The resulting supernatant is clear.

Once the floc settles, the supernatant is pumped from the reactor/settling tank through a filter, preferably a 10 micron Bag filter 4 and into a holding tank 5 from which the treated water can be pumped for reuse.

The supernatant is preferably pumped through a port 6 at the top of the cone-shaped portion of the reactor/settling tank. This method of separating the supernatant from the precipitated sludge is advantageous over separating the supernatant by draining the wastewater over a separation device such as a belt filter as it reduces the amount of filtration and filtration equipment required. Simplified filtration of the supernatant enables greater trouble free operation and thus reduces operational downtime and costs.

Once the supernatant has been removed from the reactor/settling tank, the sludge is pumped into a third tank 7 where the sludge is accumulated and thickened.

Once a sufficient amount of sludge has been accumulated and thickened, the sludge is pumped to a solar dewatering unit 8 located on top of the water treatment facility. The solar dewatering unit consists of a drainable drying pan 9 covered by a solar collecting device 10. This arrangement provides a utilized water treatment/recycling unit which can advantageously be moved from site to site, for example to different areas in a chemical plant. The unit can also be positioned at a marine cargo container terminal which will allow the proper disposal of wastewater and solid residues from such sites. Since, as shown in FIG. 2, the unit can be built into a standard cargo container (shown by dashed lines), the unit provides an integrated, mobile treatment system which will solve the compliance problems of many smaller companies or processors who, at the present time, generate only relatively small amounts of contaminated water and cannot justify the capital expenditure of an on-site treatment system.

The solar collecting device acts very much like a green house, collecting solar radiation in order to accelerate the drying process. Through the use of sunlight energy, the solar dewatering unit is able to reduce the water content of the sludge to below 50 percent, the percentage water content currently required by many landfills for the disposal of solid wastes. The primary purpose of the solar collecting device is to focus solar energy on to the sludge. The solar collecting device also serves to divert incidental rainfall. The solar collecting device generally consists of a translucent material such as a clear plastic. The solar collecting device should be at least partially removable from the drying pan in order to allow access for removal of the sludge.

The drying pan possesses an underdrain system 11 that allows for the drainage of water. The drying pan can be of varying size. The drying pan is preferably mounted atop a water treatment container that is sufficiently large to dry over six months of accumulated sludge at a time.

In order for the treatment process to be a recycling process, a wash rack 12 capable of holding large volumes of water is arranged so that the wash rack receives and stores the wastewater effluent. The wash rack is also coordinated so that it supplies the reactor/settling tank with wastewater for treatment. Thus, the wash rack completes the closed loop enabling the same batch of water to be continuously used and recycled.

A typical water quality profile for industrial wastewater generated by marine cargo container washout water is shown in Table 1.

TABLE 1

| Metal | Untreated Water Content (ppm) | Treated Water Content (ppm) | Removal (%) |
| --- | --- | --- | --- |
| Copper | 0.11 | 0.06 | 55 |
| Nickel | 0.4 | 0.04 | 90 |
| Zinc | 14.0 | 1.42 | 90 |
| Chromium | 2.0 | 0.02 | 90 |

In a further embodiment of the present invention, the above described purification system is automated such that the addition of base to neutralize the pH, the addition of the oxidizing agent, the addition of the water purifying composition, the operation of the mixer, and the various pumps are electronically coordinated 13 for automated operation. This embodiment of the present invention facilitates the on-site use of the instant invention by those of relatively little skill in the art.

The above described purification system can be portable both within the treatment site and from site to site. The system can be arranged in a relatively compact space such that it will fit on a standard truck chassis. As noted above, the solar dewatering unit is preferably placed on the roof of the treatment facility. Thus, given the compact arrangement of the purification system of the present invention, it is possible to place the entire wastewater processing system on a transportation means such as a standard chassis. The transportability of the instant invention presents a significant advantage since most container maintenance depots are operated on leased land. Therefore it is desireable to be able to transport the purification system from site to site.

The instant invention provides several advantages over the prior art. The instant invention provides a single step, operationally simple process for the removal of impurities including heavy metal, fats, oils, grease and paint residues from wastewater. It has the further advantage that it enables on-site dewatering of the generated solid wastes to water content levels below 50 percent. It is important to note that the instant invention can be practiced through the combination of relatively inexpensive, commercially available equipment and compositions. Thus, a large capital investment for custom designed equipment is not required to practice the invention. The invention is also energy efficient, only requiring energy input for pumping the wastewater and sludge and for the mixing required during the addition of the purifying composition and oxidant. Significant energy costs for dewatering the resulting solid wastes are avoided since solar energy is employed. The water treatment process of the invention is also operational on a larger scale, enabling the processing of up to 16,000 gallons per day using a 350 gallon settling tank. The process is also operationally simple, capable of automated operation which thus eliminates the need for skilled operators.

It is understood that the above described purification system can be scaled up or down depending on the needs of the users. Furthermore, it is within the skill of one of ordinary skill in the art to arrange the tanks and filters in series in order to accommodate the purification of greater volumes per unit time.

What is claimed is:

1. A method for removing heavy metals, paint residues, fats, oils and grease from wastewater and processing the resulting solid wastes in an apparatus, the method comprising the steps of:
   a) placing wastewater into a reactor/settling tank;
   b) additively mixing a water purifying composition and an oxidant into the wastewater to yield a mixture;
   c) neutralizing the pH of the mixture to 7.5–9.4;
   d) allowing the mixture to stand until the purifying composition forms a sludge at the bottom of the tank leaving an essentially heavy metal and oil free supernatant;
   e) pumping the resulting supernatant through a filter to yield recyclable wastewater suitable for disposal or reuse;
   f) pumping the sludge to a holding tank where the sludge is thickened; and
   g) pumping the sludge to a solar dewatering unit, wherein said sludge is dewatered to a water content of less than 50%, wherein the reactor/settling tank, the holding tank and solar dewatering unit of the apparatus are arranged to form a portable unit.

2. The method of claim 1 wherein the reactor/settling tank possesses a cone-shaped bottom.

3. The method of claim 2 wherein the steps are automated.

4. The method of claim 1 wherein said water purifying composition comprises a bentonite clay chemical binding agent.

5. The method of claim 4 wherein the oxidant used is sodium hypochlorite.

6. The method of claim 5 wherein the steps are automated.

7. The method of claim 4 wherein the steps are automated.

8. The method of claim 1 wherein the steps are automated.

9. A method for treating wastewater, processing the resulting solid wastes and producing reusable water in an apparatus, comprising the steps of:
   a) adding an oxidizing agent and a reactive settling agent to the wastewater in a reactor/settling tank, thereby forming a mixture;
   b) adjusting, in the reactor/settling tank, the pH of the mixture to 7.5 to 9.4 with a base;
   c) allowing the mixture to stand in the reactor/settling tank, until the settling agent forms a sludge at the bottom of the reactor/settling tank and a supernatant;
   d) pumping the supernatant from the reactor/settling tank through a filter to yield wastewater suitable for disposal or reuse;
   e) pumping the sludge from the reactor/settling tank to a holding tank where the sludge is thickened; and
   f) pumping the sludge from the holding tank to a solar dewatering unit, wherein the sludge is dewatered to have a water content of less than 50%, and wherein the reactor/settling tank, the holding tank and the solar dewatering unit of the apparatus are arranged to form a portable unit.

10. The method of claim 9, wherein the steps are automated.

* * * * *